C. A. DORN, J. O. LUDLAM & C. F. & L. C. BONNOT.
CRUSHING AND PULVERIZING MILL.
APPLICATION FILED NOV. 14, 1907.
924,439.
Patented June 8, 1909.
5 SHEETS—SHEET 2.
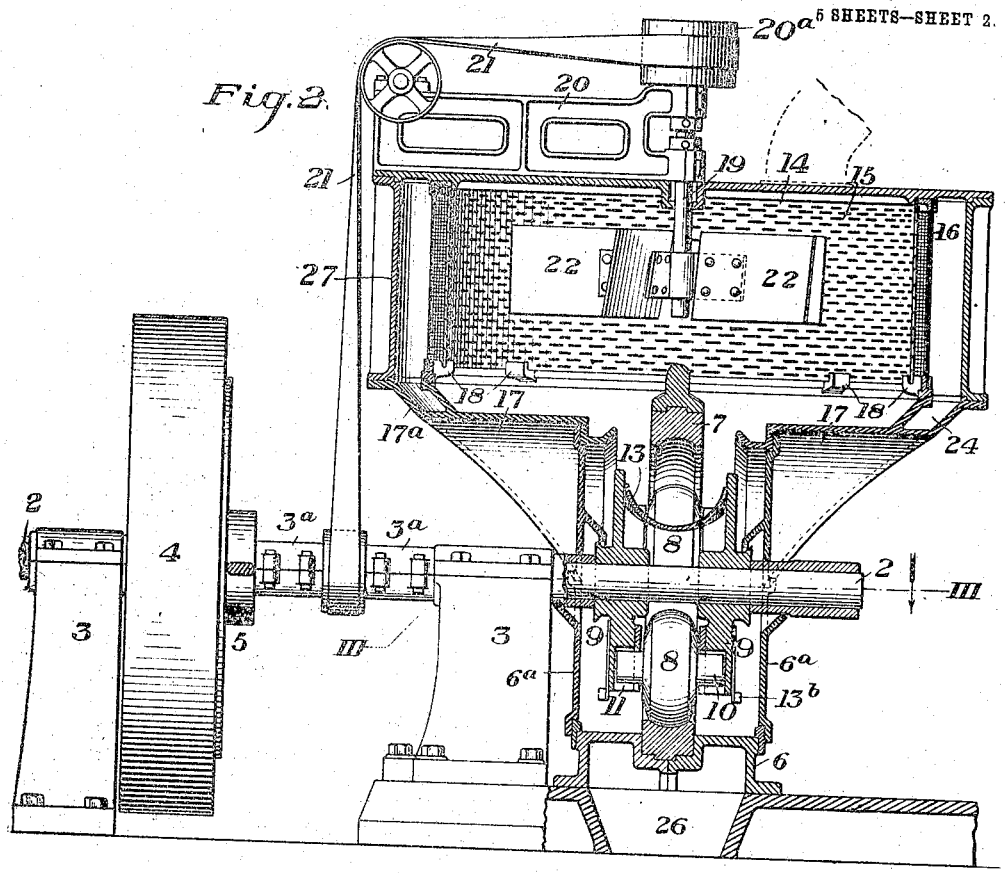
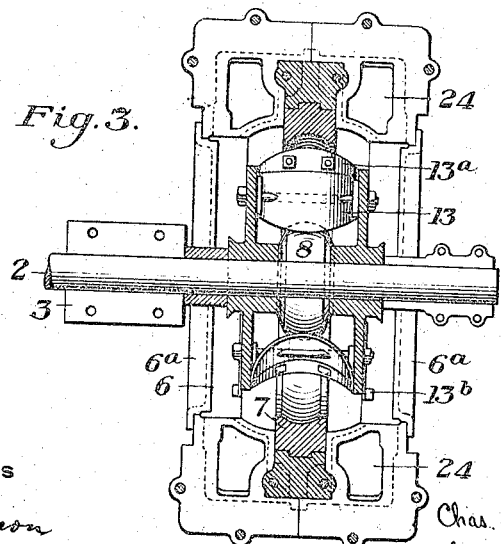

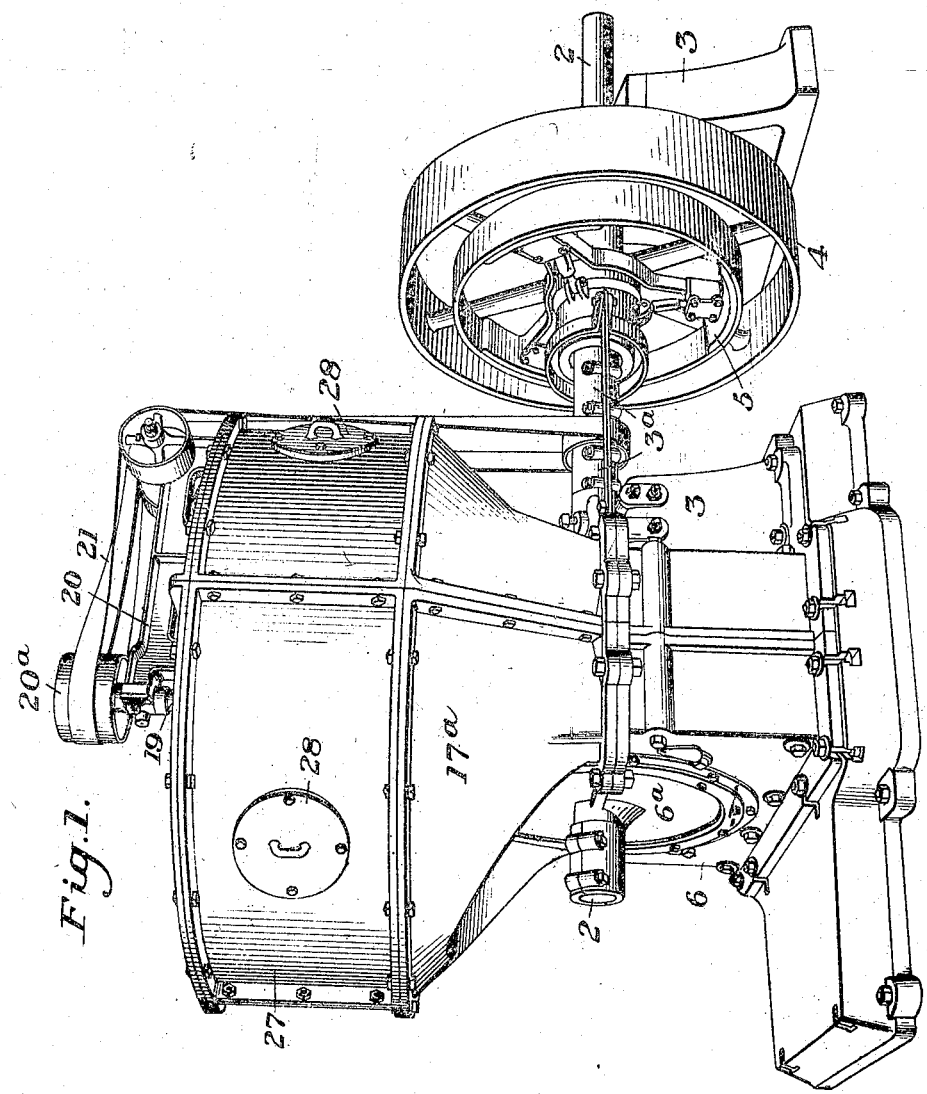

C. A. DORN, J. O. LUDLAM & C. F. & L. C. BONNOT.
CRUSHING AND PULVERIZING MILL.
APPLICATION FILED NOV. 14, 1907.
924,439.
Patented June 8, 1909.
5 SHEETS—SHEET 3.
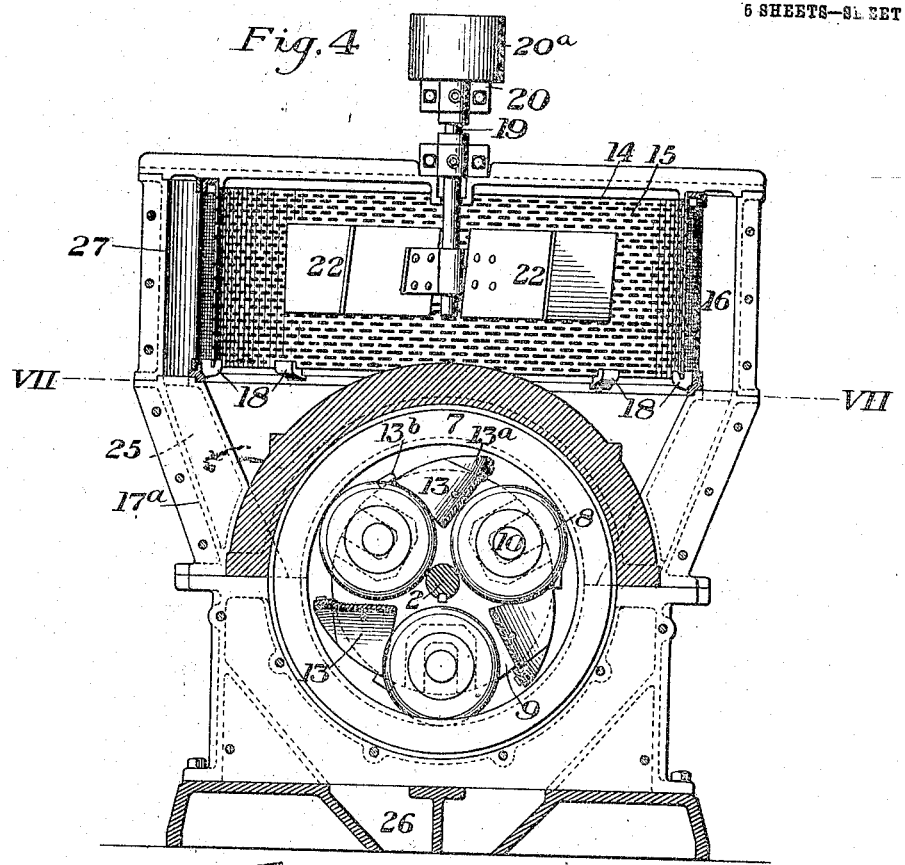
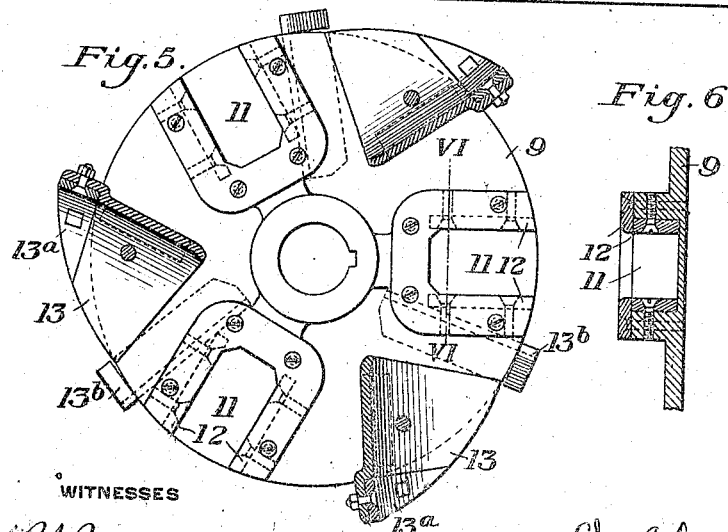
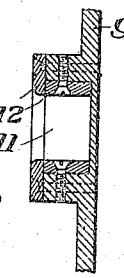

C. A. DORN, J. O. LUDLAM & C. F. & L. C. BONNOT.
CRUSHING AND PULVERIZING MILL.
APPLICATION FILED NOV. 14, 1907.

924,439.

Patented June 8, 1909.
5 SHEETS—SHEET 5.

WITNESSES
R. A. Balderson
W. W. Swartz

INVENTOR
Chas. A. Dorn, Jno. O. Ludlam,
Chas. F. Bonnot, Louis C. Bonnot
by Bakewell, Byrnes & Parmelee,
their Attys.

UNITED STATES PATENT OFFICE.

CHARLES A. DORN, JOHN O. LUDLAM, AND CHARLES F. BONNOT, OF CANTON, AND LOUIS C. BONNOT, OF LOUISVILLE, OHIO.

CRUSHING AND PULVERIZING MILL.

No. 924,439.   Specification of Letters Patent.   Patented June 8, 1909.

Application filed November 14, 1907. Serial No. 402,149.

*To all whom it may concern:*

Be it known that we, CHARLES A. DORN, JOHN O. LUDLAM, and CHARLES F. BONNOT, of Canton, Stark county, Ohio, and LOUIS C. BONNOT, of Louisville, Stark county, Ohio, have invented a new and useful Crushing or Pulverizing Mill, of which the following is a full, clear, and exact description, reference being had to the accompanying drawings, forming part of this specification, in which—

Figure 7:
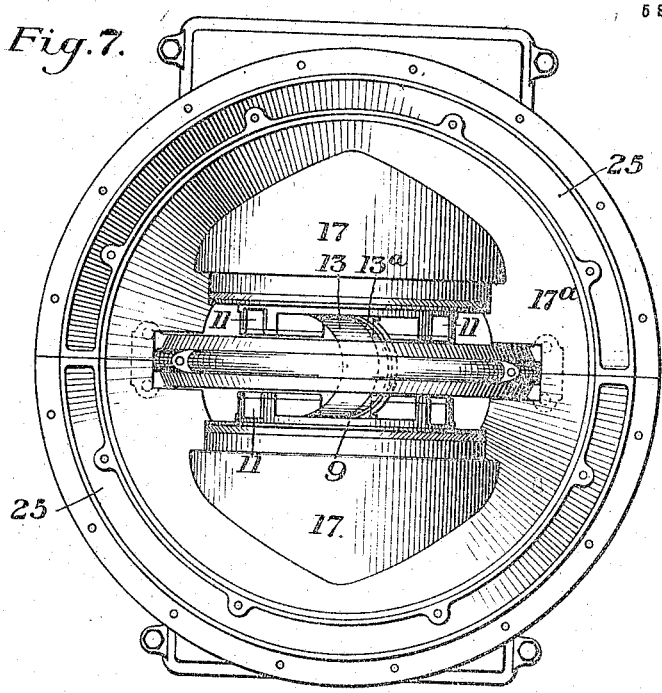
Figure 8:
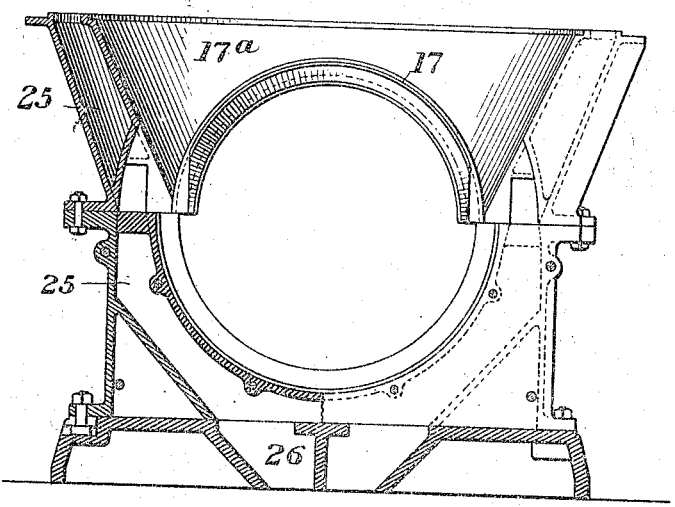
Figure 9:
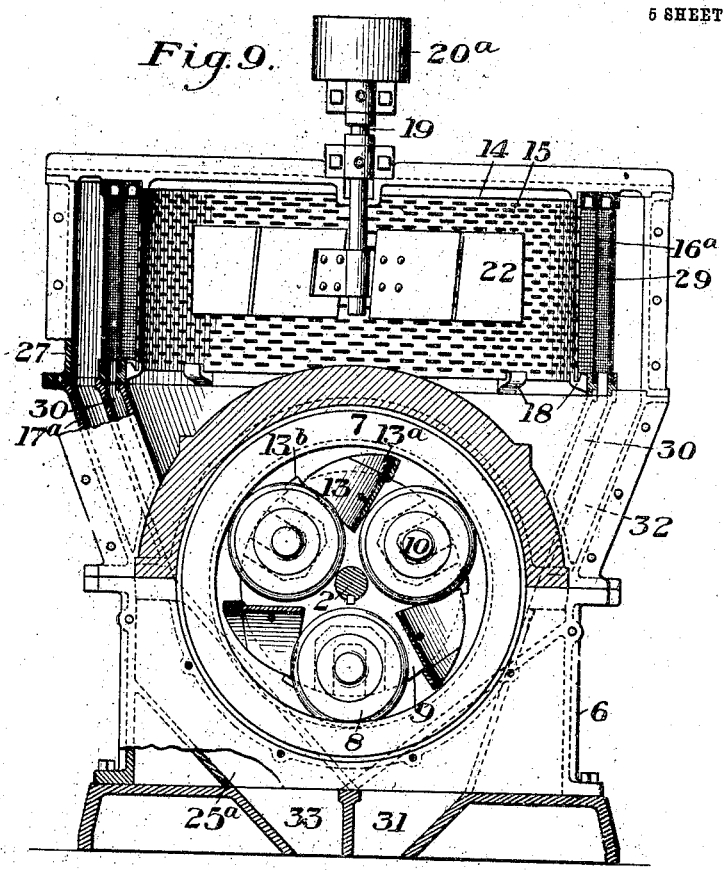
Figure 10:
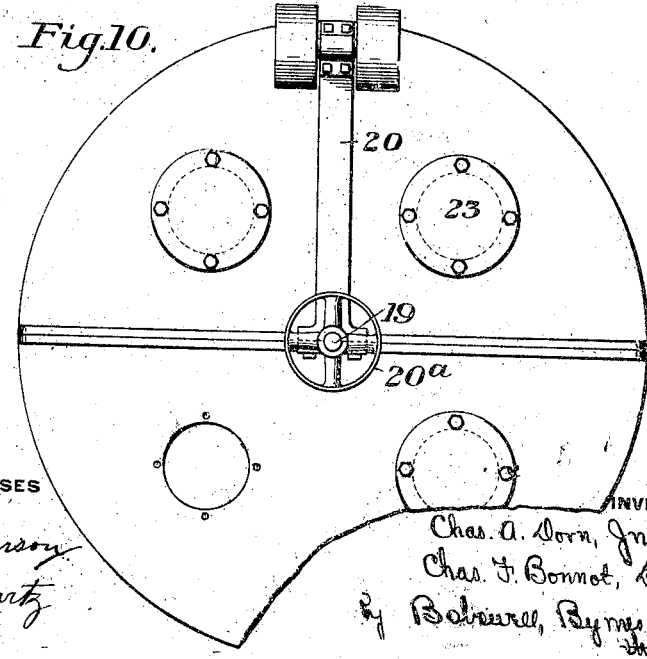

Figure 1 is a perspective view of a crushing or pulverizing mill embodying our invention; Fig. 2 is a vertical section of the same; Fig. 3 is a section on the line III—III of Fig. 2; Fig. 4 is a vertical section through the main portion of the machine, the plane of the section being at right angles to the section shown in Fig. 2; Fig. 5 is a detail view showing one of the disks or plates between which the crushing wheels are located, with the plows in section; Fig. 6 is a section on the line VI—VI of Fig. 5; Fig. 7 is a plan view of that portion of the machine below the line VII—VII of Fig. 4; Fig. 8 is a sectional view of the grinding portion of the machine with the working parts removed; Fig. 9 is a view similar to Fig. 2, but showing a modification; and Fig. 10 is a top plan view.

Our invention relates to the class of crushing or pulverizing machines such as are used for crushing or pulverizong coal, coke, lime, cement, etc.; and is designed to provide a simple and efficient machine for such purpose which will pulverize materials rapidly and economically.

A further object of the invention is to provide a machine of this character having a large screening capacity amply equal to that of its crushing or pulverizing capacity, and in which the parts are so arranged as to prevent clogging or choking of the screens. Also to provide means whereby the coarser particles which are separated out by the screens drop back to the crushing chamber for its further action.

A still further object is to prevent the discharge of dust from the machine, and to make it readily accessible in all its parts, for repairs or changes.

Our invention will be best understood by reference to the accompanying drawings, which will now be described, it being premised, however, that various changes may be made therein by those skilled in the art without departing from the spirit and scope of our invention as defined by the appended claims.

In these drawings, the numeral 2 designates the main or driving shaft, which is journaled in suitable bearings 3, which may be driven by a belt pulley 4, or other suitable gearing, through the medium of a clutch 5 of any approved form. The overhung end portion of the shaft 2 extends through a casing 6, which forms the crushing or pulverizing chamber of the machine. Placed centrally of said chamber is an annular track or ring 7, which is rigidly secured in the casing 6, and whose inner face forms the surface against which work a series of crushing or pulverizing wheels 8. These wheels are located between two disks or plates 9 (one of which is shown in detail in Fig. 5) which are rigidly secured to the shaft 2 within the crushing or pulverizing chamber. For driving these wheels they are provided with gudgeons 10 at each side, which are dropped loosely into open slots or pockets 11 in the disks or plates 9. These slots are preferably provided with renewable linings 12, as shown in Figs. 5 and 6, to take the wear, and which can be removed and replaced when necessary. The wheels are free to move freely in these slots, and are thrown outwardly by the centrifugal force of rotation into contact with the ring 7 and with the material to be crushed or pulverized. The slots or pockets 11 in the disks or plates 9 simply serve as means for driving the crushing wheels. By this construction, the unevenness of the materials being worked upon does not impart any jarring or vibration to the main shaft 2, since the rollers are free to yield individually to the material. These slots or pockets being open at their outer ends, the centrifugal force of rotation will keep them clear of the material. Secured between these wheels are plows or scoops 13 which project beyond the periphery of the disks or plates 9, as best shown in Figs. 4 and 5. These plows or scoops are of general U-shape and are inclined in a rearward direction with respect to the direction of rotation of the carrier, with their side walls diverging in the direction of rotation of the carrier. The material fed into the machine has a tendency to settle in a more or less compact mass at the bottom of the grinding chamber, and these plows or scoops displace this material from the bottom, making a path for the crushing wheels, and distributing the material evenly over the entire inner surface of the track or ring 7 directly in the path of the rollers. The scoops or plows being wider than the track or ring, they lift or throw the material upwardly into the screening chamber in the manner hereinafter described. They also assist in creating a suction within the crushing or pulverizing chamber, which draws in air from the outside, and thus tends to very largely prevent the discharge of dust into the room. This action is further assisted by the wings or vanes 13$^b$ which are carried by the plates or disks 9 at their outer sides. These vanes or wings create a further suction action, and also serve to direct the material inwardly to the action of the grinding elements. Each scoop is preferably provided with a separate removable wearing portion 13$^a$, which can be readily removed and renewed when worn.

Above the crushing or pulverizing chamber is a screen chamber 14, of a diameter very considerably greater than the width of the crushing or pulverizing chamber. This screen chamber is preferably of circular form and contains therein an inner screen 15 of relatively coarse mesh, which may consist of a perforated metal plate, and an outer concentric screen 16 of fine mesh, such as fine wire gauze. That portion of the screen chamber which is inclosed by the inner screen 15 is open at its bottom and communicates centrally with the crushing or pulverizing chamber, which is open at its top except for the ring 7. Placed at each side of the upper portion of the crushing or pulverizing chamber, and below the screen chamber, are the arched hoods 17. These arches or hoods direct the return material to the grinding rollers, where it is easily and thoroughly operated on by the rolls. The two concentric screens also open at their lower portions into the space above the arched hoods 17. The inner screen may be conveniently supported on brackets 18 on the flanged ring carried by the intermediate hopper section 17$^a$. This intermediate hopper section 17$^a$ forms the connection between the crushing or pulverizing chamber and the screening chamber, and is of decreasing diameter toward its lower end, whereby the coarser material separated out by the screens is directed back to the further action of the grinding elements, and the crushing or pulverizing chamber is itself made of relatively small compact form.

Extending centrally into the inner screen chamber is a shaft 19 journaled in suitable bearings 20 on the top of the machine and driven by a belt 21 from the shaft 2, or in any suitable manner. This shaft carries distributing blades 22, which are set at a slight angle, for the purpose of distributing the material outwardly in all directions against the screen, thereby utilizing the entire screening surface. The driving pulley 20$^a$ on the shaft 19 is preferably made removable so that different sizes of pulleys may be used interchangeably according to the speed at which it is desired to rotate the distributer. For some materials, a higher speed of the distributer is desirable than for others, and by a change in the size of this pulley, this change of speed may be readily provided for. The same result may, of course, be obtained by changing the driving pulley on the main shaft 2, or by the provision of any other well-known speed changing devices. This provision of means for changing the speed of the distributer independently of the speed of the grinding elements also permits, without other adjustment, the grinding of any particular material to varying degrees of fineness, since the slower the speed of rotation of the distributer, the greater the amount of material which falls back for regrinding.

The operation is as follows:—The material to be crushed or pulverized is fed into the machine through one of the openings 23 in its top or cover plate, and falls downwardly through the screen chamber into the crushing or pulverizing chamber, where it is crushed or pulverized between the wheels 8 and the inner surface of the ring 7. The feed openings 23 and the cover are so disposed that the material in passing through the screen chamber, will pass down around the distributer 22, and will be directed into the crushing or pulverizing chamber by the inner converging walls of the intermediate hopper section and by the arched hoods 17. The plows or scoops 13 distribute the materials to the action of the wheels 8 in the manner described, and also throw a portion of the material upwardly into the screen chamber to the action of the distributer 22, which throws such material laterally against the inner screen or baffle 15. The coarser parts of this material are held back by this screen or baffle, and fall back onto the hoods 17 and into the crushing or pulverizing chamber for further action. Of the material which passes through this screen or baffle 15, the coarser parts will also be returned to the crushing or pulverizing chamber, while the finer parts will fall through the bottom openings 24 into the discharge passages 25, and thence downwardly to a suitable discharge 26 at the base of the machine at the outside of the crushing or pulverizing chamber. The passages 25 are formed between the inner and outer walls of the intermediate hopper section 17$^a$.

The side walls of the crushing or pulverizing chamber are preferably provided with a removable plate 6$^a$ of a diameter larger than the diameter of the plates or disks 9. By removing the caps of the bearings 3, and also the spacing sleeves 3ª between said bearings, the shaft 2 together with the plates 9 and the series of wheels 8 can be moved to the right (looking at Fig. 2) sufficient to bring the wheels outside of said chamber, where they are accessible for changes or repairs, or the parts may be moved on the shaft. This also permits the crushing or pulverizing chamber to be thoroughly cleaned out.

The outer casing 27 of the screen chamber, together with the intermediate hopper section 17ª, is preferably made in sections, which are bolted or otherwise removably secured together. The top plate or cover of the screen chamber is also made removable. In this manner, access may be conveniently had to the interior of the machine by removing one or more of the casing sections. The casing 27 is also preferably provided with manholes which are normally closed by removable covers 28, by the removal of which the interior of the screening chamber may be inspected.

In the modification shown in Fig. 9, the general construction of the machine is the same as that above described. In this form, we have, however, provided for a further separation of the pulverized material by providing a third screen 29 placed outside of and concentric with the screens 15 and 16, this screen 29 being of finer mesh than the screen 16ª. The material separated by the screen 16ª passes downwardly through the chutes or discharge passages 30, which are so arranged at their lower ends as to deliver the material into a common discharge 31 at the base of the machine. The material which passes through the screen 29 falls downwardly through an outer series of passages or chutes 32, which communicate at their lower ends with a second and separate discharge 33. In this manner, the material separated by the two screens 16ª and 29 can be delivered separately.

The machine above described is extremely simple in its construction, and is also effective and economical in its operation. It will be noted that the parts which do the work of crushing or pulverizing are solid parts which are free from springs, and which do not require close bearings which would be rapidly cut out by the material being worked upon. The screening chamber may be of any desired capacity, and be sufficient to take care of the grinding capacity. By arranging the screen chamber above the crushing or pulverizing chamber, the material being worked upon is held in the latter until it is properly reduced, and all coarser particles which may be carried upwardly into the screening chamber are returned by gravity for further crushing. By the arrangement of the screen in the manner described, the material will free itself, which prevents any clogging or choking.

Owing to the fact that the grinding element rotates in a substantially vertical plane, the force of rotation of said element is utilized to throw the material upwardly into the screening chamber, it being unnecessary to provide means of any kind for changing the direction of rotation of the material until it reaches the screening chamber where it is deflected outwardly against the screen walls thereof by the action of the distributer. Furthermore, the arrangement is such that the lower portion of the grinding chamber is constantly kept free from any considerable accumulation of material which would tend to cushion the grinding elements and interfere with the efficient grinding action.

A further advantage of my invention results from the facility with which the grinding elements can be removed through an opening in the end wall of the grinding chamber without dismantling the machine, the intermediate or hopper section being arched upwardly at the side of the grinding chamber as described, for the purpose of providing sufficient space to permit of such removal.

In machines of this character the ultimate capacity of the machine is usually determined by the capacity of the screening devices. By the provision of the intermediate downwardly converging hopper section, it will be noted that the screening chamber may be made of any desired height and diameter relatively so as to give the machine a screening capacity for any kind of material which will be equal to its grinding capacity. The efficiency of the screen is also very largely increased by the manner in which the material is directed against the screening surface. That is to say, the material being thrown upwardly into the screening chamber in the manner before described, is caught by the rotary distributer and thereby deflected outwardly against the screening surface. This deflection is largely in radial lines, whereby the material strikes the screening surfaces in directions substantially perpendicular thereto and a maximum percentage of the fine material is thus separated out.

It will also be noted that we avoid the extensions of the axles or journals of the grinding elements through the walls of the grinding chamber, the only joint in the latter being where the shaft 2 passes therethrough. This construction and arrangement, combined with the suction action of the grinding elements, entirely eliminates the escape of dust from the grinding chamber into the surrounding room.

We do not limit ourselves, however, to the particular construction and arrangement which we have shown, since we believe ourselves to be the first to provide a crushing or pulverizing machine in which the axis of the distributing fan and screening surface is located above the grinding chamber and at right angles to the axis of the crushing wheels and annular track or ring.

By reason of the above construction, the crushed or pulverized material is forced upwardly into a screening chamber and distributed laterally outward through screens.

We claim:—

1. A pulverizing machine having a grinding chamber with a vertically arranged grinding ring or track therein, and a rotary grinder coöperating with the track or ring and arranged to throw the pulverized or partially pulverized material upwardly past the ring or track, in combination with a screening chamber having screening walls arranged about a vertical axis and located above the grinding chamber, and a rotary distributing device in the screening chamber arranged to deflect outwardly against the screen walls of said chamber the material which is projected upwardly by the grinder; substantially as described.

2. A pulverizing machine having a grinding chamber with a vertically arranged grinding ring or track therein, and a rotary grinder coöperating with the track or ring, in combination with a screening chamber having screen walls arranged around a vertical axis and located above the grinding chamber, and a rotary distributing device in the screening chamber arranged to deflect outwardly against the screen walls of said chamber the material which is projected upwardly by the grinder, said screening chamber being of greater diameter than the width of the grinding chamber, and a downwardly converging hopper section intermediate of and connecting with said chambers; substantially as described.

3. A pulverizing machine having a grinding chamber with a vertically arranged grinding ring or track therein, and a rotary grinder coöperating with the track or ring, in combination with a screening chamber having screening walls arranged around a vertical axis, and located above the grinding chamber, and a rotary distributing device in the screening chamber arranged to deflect outwardly against the screen walls of said chamber the material which is projected upwardly by the grinder, the rotary grinder having a series of transversely extending scoops between its grinding elements, said scoops being arranged to converge the material from both sides of the ring or track toward the ring or track; substantially as described.

4. A pulverizing machine having a grinding chamber with a vertically arranged grinding ring or track therein, and a rotary grinder coöperating with the track or ring, in combination with a screening chamber having screening walls arranged about a vertical axis and located above the grinding chamber, and a rotary distributing device in the screening chamber arranged to deflect outwardly against the screen walls of said chamber the material which is projected upwardly by the grinder, together with driving connections for the distributer having means for varying its speed independently of the speed of the grinding elements, to enable the speed of the distributing device relatively to that of the grinding elements to be varied to thereby vary the character or extent of the separation by the screens, substantially as described.

5. In a pulverizing machine, a grinding chamber having a vertically arranged grinding track or ring therein, a grinder having a plurality of centrifugally acting grinding elements which coöperate with the track or ring to effect the grinding and pulverizing, a screening chamber of relatively large diameter above the grinding chamber and into which the material is upwardly thrown by the rotary motion of the grinding elements, a rotary distributing device for deflecting outwardly against the walls of the screening chamber the material which is projected upwardly by the grinder, and means for directing back into the grinding chamber that portion of such material which does not pass through the screen walls; substantially as described.

6. In a pulverizing machine, a grinding chamber having a vertically arranged fixed grinding track or ring, a shaft journaled in bearings at one side only of the grinding chamber and having an overhung portion projecting into said chamber, a grinder removably secured to the overhung portion of the shaft within said chamber, the other side wall of said chamber having an opening therein of sufficient diameter to admit of the bodily removal therethrough of the grinder as an entirety from the free end of the shaft without removing the shaft from its bearings, and means for rotating the said shaft and grinder, substantially as described.

7. In a pulverizing machine, a grinding chamber having a grinding element therein which is journaled to rotate in a vertical plane, a screening chamber above the grinding chamber, and of greater diameter than the width of said chamber, and a downwardly converging hopper section intermediate of the grinding and screening chambers, said section having an inwardly extending upward arch at the side of the grinder to provide space for the removal of the grinder through the end wall of the grinding chamber; substantially as described.

8. A rotatable carrier for the grinding rolls of a pulverizing machine, having a U- shaped scoop in its peripheral portion, the scoop being rearwardly inclined, with its side walls diverging in the direction of rotation of the carrier to thereby force the material inwardly from both sides toward the middle of the scoop, substantially as described.

9. A pulverizing machine having reducing means adapted to throw the reduced material directly upward, a screening chamber above the reducing means and into which the reduced material is directly thrown, said chamber having screen walls arranged about a vertical axis, and a distributing device in said chamber adapted to deflect the material outward against the screen walls; substantially as described.

10. A pulverizing machine having rotary reducing means adapted to throw the reduced material directly upward, a screening chamber above the reducing means and into which the reduced material is directly thrown, said chamber having screen walls arranged about a vertical axis, a rotary distributing device in said chamber adapted to deflect the material outward against the screen walls, and means for varying the relative speeds of the reducing means and the distributer; substantially as described.

11. In a pulverizing machine, a screening chamber having screen walls arranged about a vertical axis, a grinding chamber below the screening chamber, grinding means in said chamber arranged to throw the ground or partially ground material upwardly into the screening chamber, and a rotary distributing device working in the screening chamber and arranged to change the direction of the material thrown upwardly by the grinding means and throw such material outward against the screen walls, the screen walls being formed in separate detachable sections or segments; substantially as described.

In testimony whereof, we have hereunto set our hands.

CHARLES A. DORN.
JOHN O. LUDLAM.
CHAS. F. BONNOT.
L. C. BONNOT.

Witnesses:
R. J. GOULD,
V. D. NIST.